United States Patent
Yokoyama

(10) Patent No.: US 11,825,053 B2
(45) Date of Patent: Nov. 21, 2023

(54) INFORMATION PROCESSING APPARATUS, CONTROL METHOD, AND STORAGE MEDIUM FOR UPDATING A PROGRAM

(71) Applicant: CANON KABUSHIKI KAISHA, Tokyo (JP)

(72) Inventor: Tatsuyuki Yokoyama, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 18/157,733

(22) Filed: Jan. 20, 2023

(65) Prior Publication Data
US 2023/0164281 A1 May 25, 2023

Related U.S. Application Data

(63) Continuation of application No. 17/530,052, filed on Nov. 18, 2021, now Pat. No. 11,582,361.

(30) Foreign Application Priority Data

Nov. 27, 2020 (JP) .................................. 2020-197651

(51) Int. Cl.
*H04N 1/00* (2006.01)
*G06F 3/12* (2006.01)

(52) U.S. Cl.
CPC ......... *H04N 1/00973* (2013.01); *G06F 3/123* (2013.01); *G06F 3/1204* (2013.01); *H04N 1/00435* (2013.01)

(58) Field of Classification Search
CPC ............ H04N 1/00973; H04N 1/00435; G06F 3/1204; G06F 3/123
USPC ...................................................... 358/1.15
See application file for complete search history.

(56) References Cited

U.S. PATENT DOCUMENTS

| 7,227,656 | B1 * | 6/2007 | Kato | G06K 15/00 |
| | | | | 379/9.01 |
| 2016/0179447 | A1 * | 6/2016 | Ochi | G06F 3/1288 |
| | | | | 358/1.15 |
| 2019/0332332 | A1 * | 10/2019 | Yoshida | G06F 3/1285 |

* cited by examiner

*Primary Examiner* — Allen H Nguyen
(74) *Attorney, Agent, or Firm* — Canon U.S.A., Inc. IP Division

(57) ABSTRACT

A storage medium storing a program causes a computer of an information processing apparatus to execute a method including obtaining information about a predetermined program stored in a communication apparatus, and controlling issuance of a predetermined notification about update of the predetermined program based on the obtained information about the predetermined program. The predetermined notification is controlled to be issued in a case where a version of the predetermined program is not a latest version, and the predetermined notification is controlled so as not to be issued in a case where the version of the predetermined program is the latest version.

16 Claims, 10 Drawing Sheets

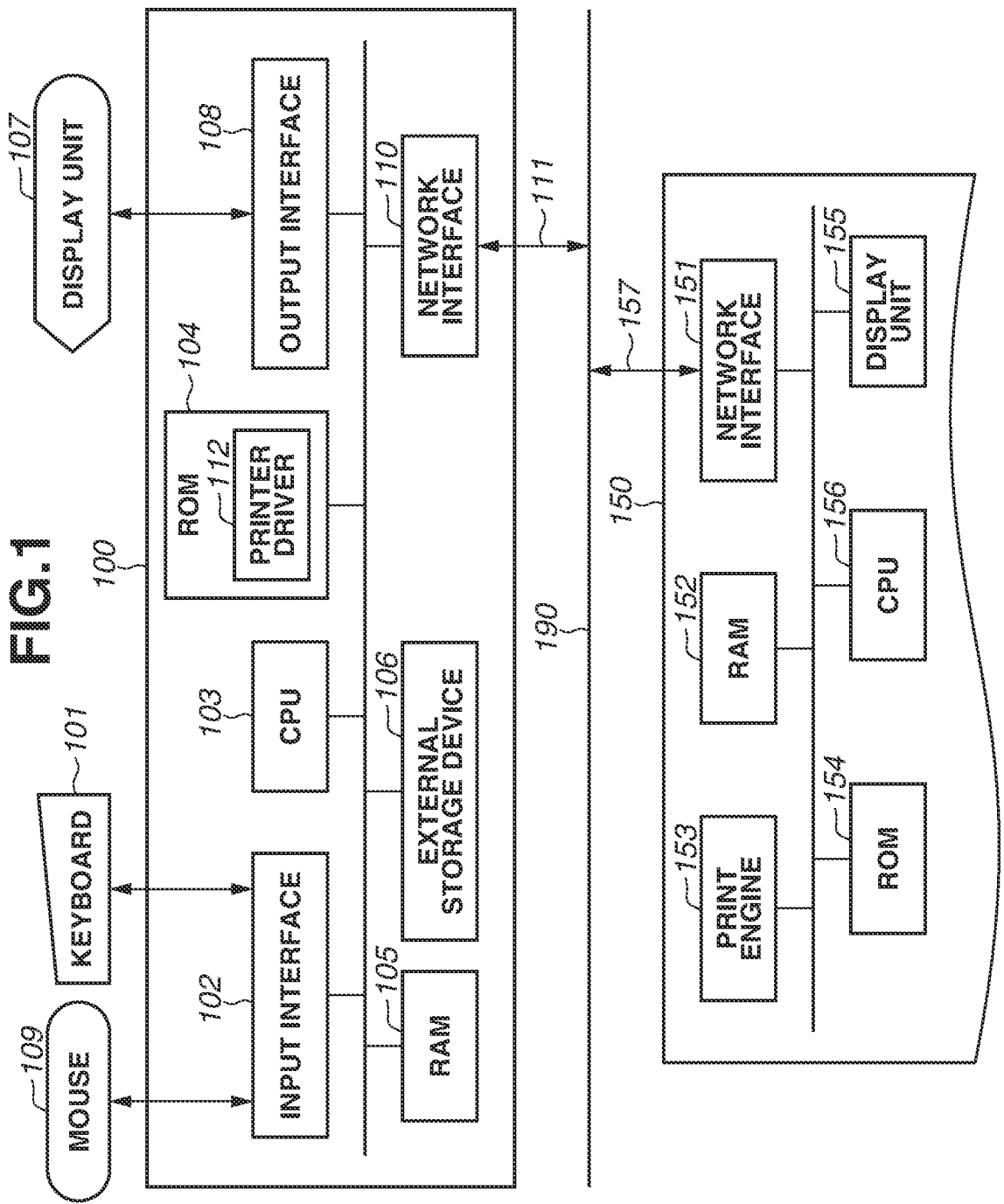

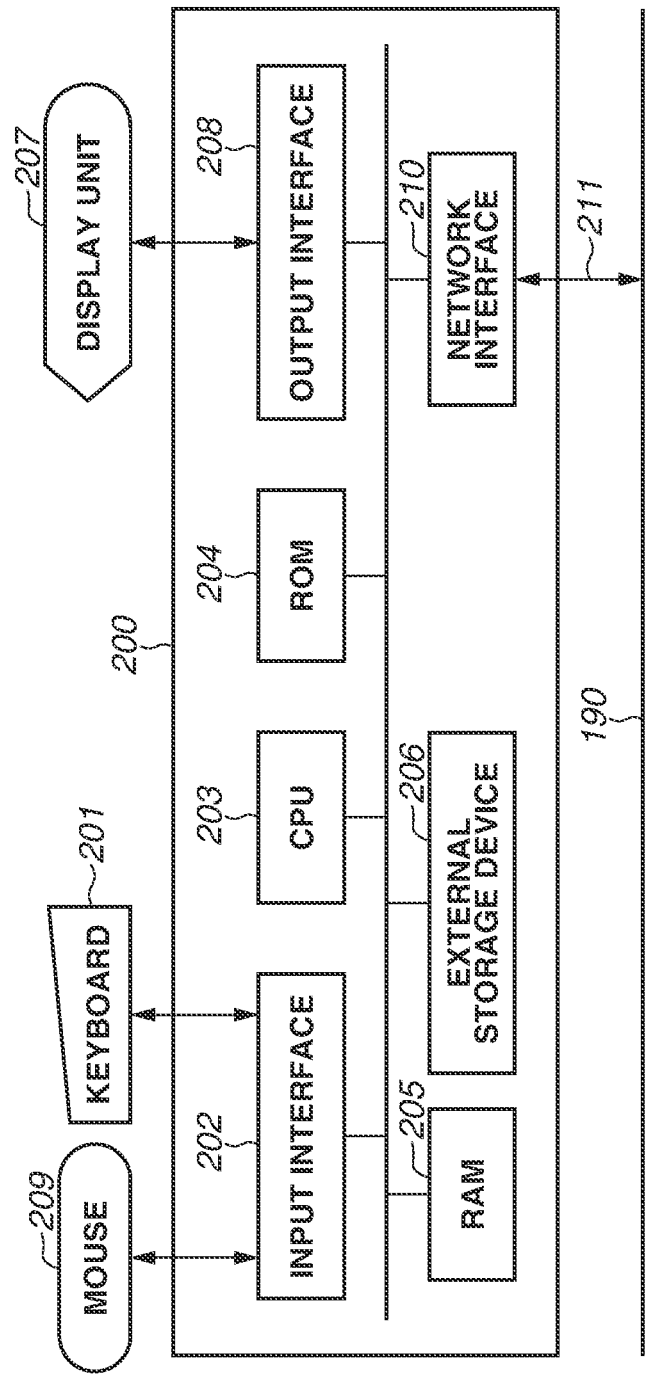

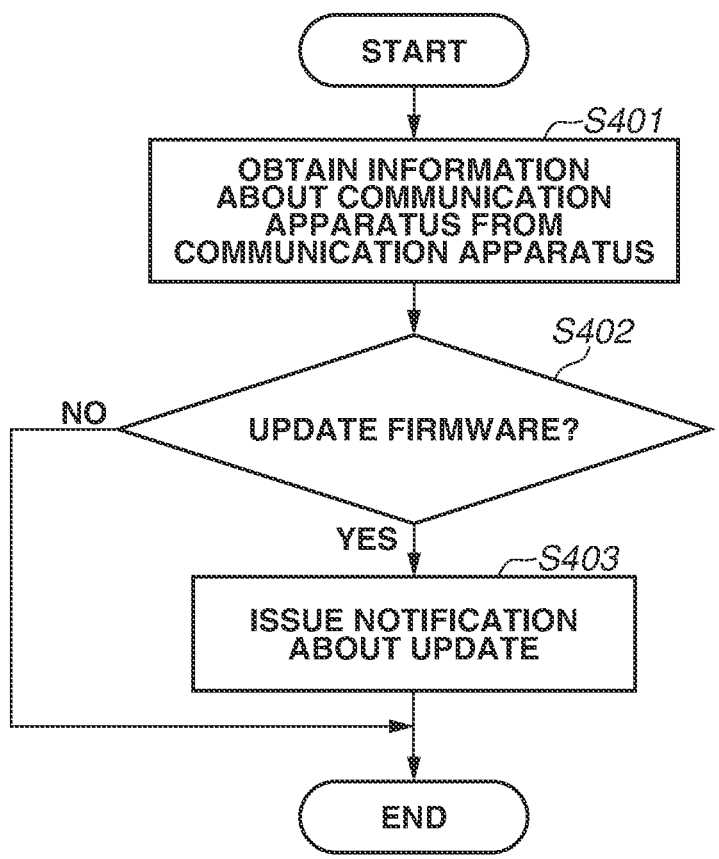

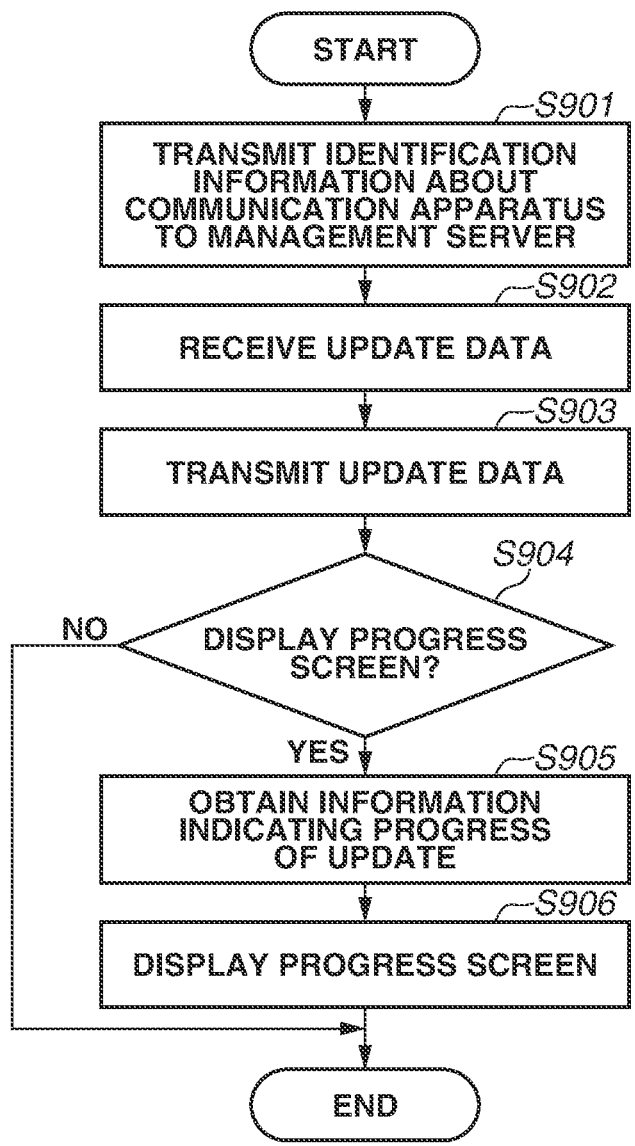

SECOND EXEMPLARY EMBODIMENT
DISPLAY EXAMPLES OF PROGRESS
SCREEN BY STATUS DISPLAY APP

INFORMATION PROCESSING APPARATUS, CONTROL METHOD, AND STORAGE MEDIUM FOR UPDATING A PROGRAM

CROSS-REFERENCE TO RELATED APPLICATIONS

This application is a Continuation of U.S. patent application Ser. No. 17/530,052, filed Nov. 18, 2021, which claims the benefit of Japanese Patent Application No. 2020-197651, filed Nov. 27, 2020, both of which are hereby incorporated by reference herein in their entirety.

BACKGROUND

Field of the Disclosure

The present disclosure relates to an information processing apparatus, a control method, and a storage medium.

Description of the Related Art

A technique where a communication apparatus, such as a printer, obtains information stored in a server and updates a program such as firmware has been known (see Japanese Patent Application Laid-Open No. 2011-186588).

SUMMARY

With the prevalence of configurations for updating a program stored in a communication apparatus, there has been a demand for appropriate execution of the update of the program stored in the communication apparatus.

Embodiments of the present disclosure are directed to performing processing for more appropriately updating a program stored in a communication apparatus.

According to embodiments of the present disclosure, an information processing apparatus includes an obtaining unit configured to obtain information about a predetermined program stored in a communication apparatus, and a control unit configured to control issuance of a predetermined notification about update of the predetermined program based on the obtained information about the predetermined program. The predetermined notification is controlled to be issued in a case where a version of the predetermined program is not a latest version, and the predetermined notification is controlled so as not to be issued in a case where the version of the predetermined program is the latest version. The communication apparatus includes an automatic update function that is a function of automatically attempting to update the predetermined program without a user's operation on the communication apparatus in a case where a predetermined condition is satisfied. The issuance of the predetermined notification includes processing for prompting the user to enable the automatic update function.

Further features of the present disclosure will become apparent from the following description of exemplary embodiments with reference to the attached drawings.

BRIEF DESCRIPTION OF THE DRAWINGS

FIG. 1 is a hardware configuration diagram of a communication apparatus and an information processing apparatus.

FIG. 2 is a hardware configuration diagram of a management server.

FIG. 4 is a flowchart illustrating notification processing which is performed by the information processing apparatus.

FIG. 9 is a flowchart illustrating processing to be performed in a case where an update execution button is operated.

DESCRIPTION OF THE EMBODIMENTS

Exemplary embodiments of the present disclosure will be described in detail below with reference to the accompanying drawings. The following exemplary embodiments are not intended to limit the present disclosure, and all combinations of features described in the exemplary embodiments are not necessarily indispensable to solving means of the present disclosure.

A first exemplary embodiment of the present disclosure will be described below. An information processing apparatus and a communication apparatus included in a communication system according to the present exemplary embodiment will be described. In the present exemplary embodiment, a personal computer (PC) will be described as an example of the information processing apparatus. However, this is not restrictive. Various apparatuses such as a smartphone, a mobile terminal, a tablet terminal, a personal digital assistant (PDA), and a digital camera can be applied as the information processing apparatus. In the present exemplary embodiment, a printer will be described as an example of the communication apparatus. However, this is not restrictive. Various apparatuses that can communicate wirelessly with the information processing apparatus and update firmware are applicable. For example, printers, such as an inkjet printer, a full color laser beam printer, and a monochrome printer, are applicable. Aside from printers, apparatuses such as a copying machine, a facsimile apparatus, a mobile terminal, a smartphone, a laptop PC, a tablet terminal, a PDA, a digital camera, a music playback device, a television set, and a smart speaker are also applicable. A multifunction peripheral having a plurality of functions, such as a copy function, a facsimile (FAX) function, and a print function, is also applicable.

Figure 3A:
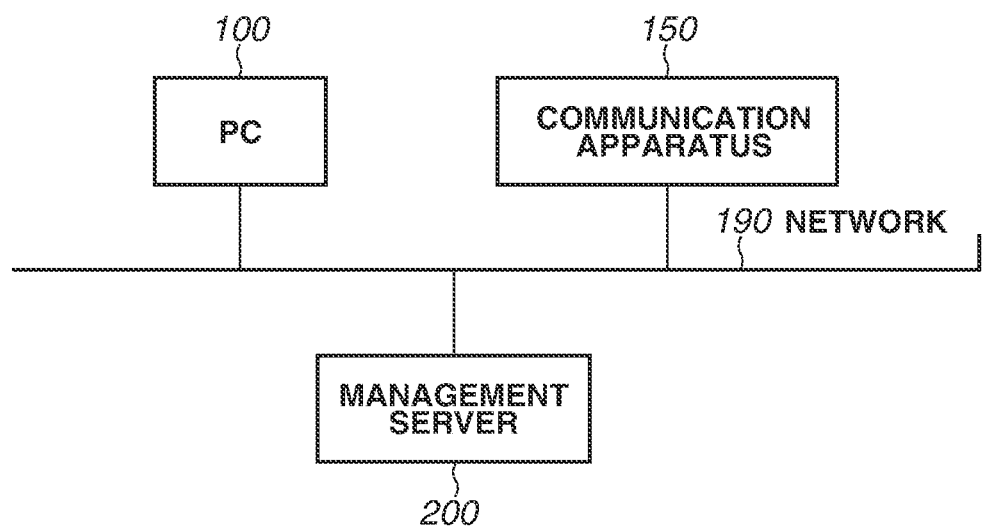
FIGS. 3A and 3B are block diagrams illustrating configurations of a communication system.

FIG. 3A is a block diagram illustrating a configuration of the communication system according to the present exemplary embodiment. The communication system according to the present exemplary embodiment includes a PC 100 that is the information processing apparatus according to the present exemplary embodiment, a network 190, a communication apparatus 150, and a management server 200. In the present exemplary embodiment, the PC 100, the communication apparatus 150, and the management server 200 are each connected to the network 190.

The apparatuses can thus communicate with each other via the network 190. Specifically, for example, the PC 100 transmits a print job to the communication apparatus 150 and obtains information from the communication apparatus 150 via the network 190. The communication apparatus 150 receives update data to be described below from the management server 200. In the present exemplary embodiment, the management server 200 is a server system including one or a plurality of PCs, for example. The communication system according to the present exemplary embodiment is not limited to such a configuration. For example, the communication system may include a connection path by which the PC 100 and the communication apparatus 150 are directly connected without the intervention of the network 190. The communication between the PC 100 and the communication apparatus 150 may be implemented via the connection path. The apparatuses and the network 190 may be connected via a wireless local area network (LAN) router, for example.

A hardware configuration of the PC 100 and the communication apparatus 150 will initially be described with reference to the block diagram of FIG. 1. While the present exemplary embodiment is described by using the following configuration as an example, the present exemplary embodiment is applicable to an apparatus that can communicate with a communication apparatus, and the functions are not particularly limited to those illustrated in FIG. 1.

The PC 100 includes an input interface 102, a central processing unit (CPU) 103, a read-only memory (ROM) 104, a random access memory (RAM) 105, an external storage device 106, an output interface 108, a display unit 107, a keyboard 101, a mouse 109, and a network interface 110. The CPU 103, the ROM 104, and the RAM 105 constitute a computer of the PC 100.

The network interface 110 connects to the network 190 via a network cable 111. In the present exemplary embodiment, the network cable 111 is a Universal Serial Bus (USB) cable. However, this is not restrictive. For example, a wired LAN cable may be used. The network interface 110 may be an interface for connecting wirelessly to the network 190 instead of one for connecting to the network 190 in a wired manner. Examples of the wireless communication method used for the wireless connection may include a communication method compliant with the Institute of Electrical and Electronics Engineers (IEEE) 802.11 series (Wi-Fi), Bluetooth®, and Near Field Communication (NFC). Bluetooth® may be Bluetooth® Classic or Bluetooth® Low Energy. The PC 100 may include both an interface for connecting to the network 190 in a wired manner and an interface for connecting wirelessly to the network 190.

The input interface 102 receives data input and operation instructions from a user through operation of operation units, such as the keyboard 101 and the mouse 109. The operation units may include a physical keyboard or physical buttons, or a software keyboard or software buttons displayed on the display unit 107. In other words, the input interface 102 may receive the user's input via the display unit 107.

The CPU 103 is a system control unit and controls the entire PC 100.

The ROM 104 stores therein fixed data, such as control programs to be executed by the CPU 103, data tables, and a built-in operating system (OS) program. In the present exemplary embodiment, the control programs stored in the ROM 104 perform software execution controls, such as scheduling, task switching, and interrupt handling under management of the built-in OS program stored in the ROM 104. In the present exemplary embodiment, a printer driver 112 for generating print information interpretable by the communication apparatus 150 is stored in the ROM 104.

The RAM 105 includes a static random access memory (SRAM) which uses a backup power supply. A memory area where setting information about the PC 100 and management data on the PC 100 are stored is located in the RAM 105. The RAM 105 is also used as a main memory and a work memory of the CPU 103.

The external storage device 106 is a memory used to store various types of information. The information stored in the external storage device 106 may be stored in other memories, such as the ROM 104.

The output interface 108 is an interface for controlling display of data and notification of a state of the PC 100 by the display unit 107.

The display unit 107 includes a light-emitting diode (LED) and a liquid crystal display (LCD), and displays data.

The communication apparatus 150 includes a network interface 151, a RAM 152, a print engine 153, a ROM 154, and a CPU 156. The ROM 154, the RAM 152, and the CPU 156 constitute a computer of the communication apparatus 150.

The network interface 151 connects to the network 190 via a network cable 157. In the present exemplary embodiment, the network cable 157 is a USB cable. However, this is not restrictive. For example, a wireless LAN cable may be used. The network interface 151 may be an interface for connecting wirelessly to the network 190 instead of one for connecting to the network 190 in a wired manner. Examples of the wireless communication method used for the wireless connection may include a communication method compliant with the IEEE 802.11 series (Wi-Fi), Bluetooth®, and NFC. Bluetooth® may be Bluetooth® Classic or Bluetooth® Low Energy. The communication apparatus 150 may include both an interface for connecting to the network 190 in a wired manner and an interface for wirelessly connecting to the network 190.

The RAM 152 includes an SRAM which uses a backup power supply. A memory area where setting information about the communication apparatus 150 and management data on the communication apparatus 150 are stored is located in the RAM 152. The RAM 152 is also used as a main memory and a work memory of the CPU 156. The RAM 152 functions as a reception buffer for temporarily storing print information received from the PC 100, and stores various types of information.

The ROM 154 stores fixed data, such as control programs to be executed by the CPU 156, data tables, and a built-in OS program. In the present exemplary embodiment, the ROM 154 stores a status management program. The status management program monitors the state of the communication apparatus 150 based on information about not-illustrated various sensors in the communication apparatus 150, generates status information, and stores the status information into the RAM 152. In the present exemplary embodiment, the control programs stored in the ROM 154 perform software execution controls, such as scheduling, task switching, and interrupt handling under management of the built-in OS program stored in the ROM 154. In the present exemplary embodiment, the ROM 154 stores firmware of the communication apparatus 150. In the present exemplary embodiment, the firmware of the communication apparatus 150 is a program for controlling various pieces of hardware of the communication apparatus 150.

The CPU 156 is a system control unit and controls the entire communication apparatus 150.

The print engine 153 forms an image on a recording medium, such as a sheet of paper, by applying a recording agent, such as ink, to the recording medium based on information stored in the RAM 152 and/or a print job received from the PC 100, and outputs the print result.

A display unit 155 includes an LED and an LCD, and displays data. In the present exemplary embodiment, the display unit 155 displays a screen including information indicating that the firmware is being updated and information indicating the progress of the update of the firmware while the firmware is being updated by the communication apparatus 150. The communication apparatus 150 may be configured without the display unit 155.

Memories, such as an external hard disk drive (HDD) and a Secure Digital (SD) card, may be attached as optional devices to the communication apparatus 150. The information stored in the communication apparatus 150 may be stored in such memories.

A hardware configuration of the management server 200 will be described with reference to the block diagram of FIG. 2.

While the present exemplary embodiment is described by using the following configuration as an example, the present exemplary embodiment is applicable to an apparatus that can communicate with a communication apparatus, and the functions are not particularly limited to those illustrated in the diagram.

The management server 200 includes an input interface 202, a CPU 203, a ROM 204, a RAM 205, an external storage device 206, an output interface 208, a display unit 207, a keyboard 201, a mouse 209, and a network interface 210. The CPU 203, the ROM 204, and the RAM 205 constitute a computer of the management server 200.

The network interface 210 connects to the network 190 via a network cable 211. In the present exemplary embodiment, the network cable 211 is a wired LAN cable. However, this is not restrictive. For example, the network cable 211 may be a USB cable. The network interface 210 may be an interface for wirelessly connecting to the network 190 instead of one for connecting the network 190 in a wired manner. Examples of the wireless communication method used for the wireless connection may include a communication method compliant with the IEEE 802.11 series (Wi-Fi), Bluetooth®, and NFC. Bluetooth® may be Bluetooth® Classic or Bluetooth® Low Energy. The management server 200 may include both an interface for connecting to the network 190 in a wired manner and an interface for connecting wirelessly to the network 190. In the present exemplary embodiment, the network 190 is the Internet.

The input interface 202 receives data input and operation instructions from a user through operation of operation units, such as the keyboard 201 and the mouse 209. The operation units may include a physical keyboard or physical buttons, or a software keyboard or software buttons displayed on the display unit 207. In other words, the input interface 202 may receive the user's input via the display unit 207.

The CPU 203 is a system control unit and controls the entire management server 200.

The ROM 204 stores fixed data, such as control programs to be executed by the CPU 203, data tables, and a built-in OS program. In the present exemplary embodiment, the control programs stored in the ROM 204 perform software execution controls, such as scheduling, task switching, and interrupt handling under management of the built-in OS program stored in the ROM 204.

The RAM 205 includes an SRAM using a backup power supply. A memory area where setting information about the management server 200 and management data on the management server 200 are stored is located in the RAM 205. The RAM 205 is also used as a main memory and a work memory of the CPU 203.

The external storage device 206 stores data (update data) for updating the firmware of the communication apparatus 150 and information about the update data. In the present exemplary embodiment, firmware in apparatuses of different types and model numbers is updated by using respective different pieces of update data. The external storage device 206 stores a plurality of different pieces of update data for respective types and model numbers. In the present exemplary embodiment, the update data is the latest firmware itself, and the communication apparatus 150 that has received the update data performs update by replacing the old firmware having been stored with the update data. However, such a configuration is not restrictive. Instead of being the latest firmware itself, the update data may be data for updating the old firmware stored in the communication apparatus 150 by modifying part of the firmware or adding a program or programs to the firmware. The information stored in the external storage device 206 may be stored in other memories, such as the ROM 204.

The output interface 208 is an interface for controlling display of data and notification of a state of the management server 200 by the display unit 207.

The display units 207 includes an LED and an LCD, and displays data.

As described above, in the present exemplary embodiment, the communication apparatus 150 can update the firmware currently stored in the communication apparatus 150 by using the update data stored in the management server 200. However, even if the communication apparatus 150 is in a state where the firmware is to be updated, the communication apparatus 150 can sometimes fail to update the firmware because no operation for executing the update is received from the user. The state where the firmware currently stored in the communication apparatus 150 is to be updated refers to where the version of the firmware currently stored in the communication apparatus 150 is not the latest version of the firmware. In such a case, a notification about the update is desirably provided to the user so that the user is prompted to make the operation for executing the update.

In the present exemplary embodiment, if the version of the firmware currently stored in the communication apparatus 150 is not the latest version of the firmware, a notification about the update is therefore issued to prompt the user to make the operation for executing the update.

In the present exemplary embodiment, the communication apparatus 150 has a function (automatic update function) where the communication apparatus 150 automatically attempts to update the firmware of the communication apparatus 150 without being based on user operations on the communication apparatus 150 if a predetermined condition is satisfied. The predetermined condition referred to in the automatic update function is not limited in particular. Examples include a lapse of a predetermined time from the previous update, and a lapse of a predetermined time from power-on of the communication apparatus 150. The predetermined condition may include that the communication apparatus 150 is in a state in which firmware update is executable and that the firmware of the communication apparatus 150 is not the latest firmware.

Figure 6:
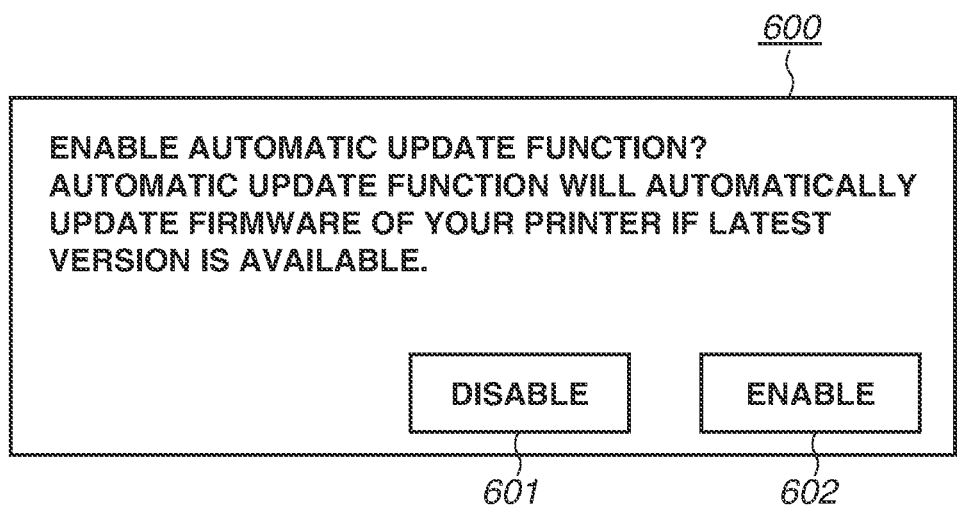
FIG. 6 illustrates an example of a screen for receiving input of a setting of an automatic update function.

In the present exemplary embodiment, the user can freely set whether to enable or disable the automatic update function of the communication apparatus 150. For that purpose, the communication apparatus 150 receives an input for setting whether to enable or disable the automatic update function of the communication apparatus 150. FIG. 6 illustrates a screen displayed to receive the input. If a button 601 is operated, the automatic update function of the communication apparatus 150 is disabled. If a button 602 is operated, the automatic update function of the communication apparatus 150 is enabled. With the automatic update function of the communication apparatus 150 disabled, the operation time in a predetermined state to be described below is not counted up. The screen of FIG. 6 is displayed, for example, when the communication apparatus 150 is powered on, in a case where initial settings of the communication apparatus 150 are made, or in a case where the firmware of the communication apparatus 150 is determined to be updatable. However, the display timing is not limited in particular. The method for enabling the automatic update function is not limited to the foregoing, either. For example, the user may make an operation for providing an instruction to enable the automatic update function of the communication apparatus 150 on a remote control screen, and the instruction may be transmitted from the PC 100 to the communication apparatus 150. For example, by the PC 100 communicating with the communication apparatus 150, the remote control screen is displayed on a browser application on the PC 100. The communication apparatus 150 may activate the automatic update function based on the instruction. In other words, the operation for executing the update refers to, for example, the operation for activating the automatic update function of the communication apparatus 150.

In the present exemplary embodiment, the communication apparatus 150 starts to update the firmware of the communication apparatus 150 if the user makes the operation for providing an instruction to update the firmware on the screen displayed on the communication apparatus 150. For example, the instruction is transmitted from the PC 100 to the communication apparatus 150 by the user making the operation for providing an instruction to update the firmware of the communication apparatus 150 on the remote control screen. The communication apparatus 150 starts to update the firmware based on the instruction. In other words, the operation for executing the update refers to, for example, the operation for providing an instruction to update the firmware of the communication apparatus 150 on the remote control screen.

FIG. 4 is a flowchart illustrating processing which is performed by the PC 100 according to the present exemplary embodiment. This processing is implemented by the CPU 103 reading various programs stored in storage areas, such as the ROM 104 and the RAM 105 and executing the programs. The processing is performed by the printer driver 112 based on activation of the printer driver 112.

The communication apparatus 150 for the PC 100 to communicate with in this processing is identified by searching communication apparatuses on the network 190 to which the PC 100 is connected for a communication apparatus corresponding to the printer driver 112.

In step S401, the CPU 103 obtains information about the communication apparatus 150 from the communication apparatus 150 via the connection between the communication apparatus 150 and the PC 100. Examples of the information about the communication apparatus 150 to be obtained here include the status information stored by the status management program. More specifically, the information about the communication apparatus 150 includes, for example, information indicating the progress of processing of a received print job in the communication apparatus 150, information indicating an error occurred in the communication apparatus 150, and information indicating the remaining ink level and the remaining number of sheets in the communication apparatus 150. The information about the communication apparatus 150 further includes information about the firmware currently stored in the communication apparatus 150. In the present exemplary embodiment, the communication apparatus 150 receives information about the latest firmware from the management server 200 as appropriate, and determines whether the version of the firmware currently stored in the communication apparatus 150 is the latest version of the firmware. The latest firmware refers to firmware to be installed on the communication apparatus 150 by executing firmware update using the update data stored in the management server 200. If the determination is NO, the communication apparatus 150 determines that the information about the communication apparatus 150 includes the information about the firmware currently stored in the communication apparatus 150. If the determination is YES, the communication apparatus 150 determines that the information about the communication apparatus 150 does not include the information about the firmware currently stored in the communication apparatus 150. The information about the firmware currently stored in the communication apparatus 150 here includes an error code indicating that the version of the firmware currently stored in the communication apparatus 150 is not the latest version of the firmware. If the determination is NO and the automatic update function of the communication apparatus 150 is not enabled, the information about the communication apparatus 150 may include the information about the firmware currently stored in the communication apparatus 150. If the determination is NO and the automatic update function of the communication apparatus 150 is enabled, the information about the communication apparatus 150 does not necessarily need to include the information about the firmware currently stored in the communication apparatus 150. Alternatively, for example, the information about the communication apparatus 150 may always include the information about the firmware currently stored in the communication apparatus 150. The information about the firmware currently stored in the communication apparatus 150 may be information indicating the version of the information about the firmware currently stored in the communication apparatus 150. The information about the firmware currently stored in the communication apparatus 150 may be information indicating whether the automatic update function of the communication apparatus 150 is enabled.

In step S402, the CPU 103 determines whether to update the firmware currently stored in the communication apparatus 150 based on the information about the communication apparatus 150 received in step S401. If the version of the firmware currently stored in the communication apparatus 150 is not the latest version of the firmware, the determination is YES. If the version of the firmware currently stored in the communication apparatus 150 is the latest version of the firmware, the determination is NO. In particular, in the present exemplary embodiment, if the information about the communication apparatus 150 received in step S401 includes the error code indicating that the version of the firmware currently stored in the communication apparatus 150 is not the latest version of the firmware, the determination is YES. If the error code is not included, the determination is NO. The details of the determination method are not limited thereto. For example, the information about the firmware currently stored in the communication apparatus 150 may be the information indicating the version of the information about the firmware currently stored in the communication apparatus 150 as described above. In such a configuration, the CPU 103 may obtain the information about the latest version of the firmware from the management server 200, for example. Based on the information, the CPU 103 then may make the determination by comparing the version of the information about the firmware currently stored in the communication apparatus 150 with the latest version of the firmware. The information about the latest version of the firmware may be obtained in step S402 or at other timing. If the determination is YES (YES in step S402), the processing proceeds to step S403. If the determination is NO (NO in step S402), the processing of this flowchart ends without the CPU 103 issuing a notification about the update of the firmware of the communication apparatus 150. If the determination is NO, the CPU 103 may issue a notification that the firmware of the communication apparatus 150 is the latest version. In other words, if the determination is NO, the CPU 103 may issue other notifications than that issued in step S403.

Figure 5:
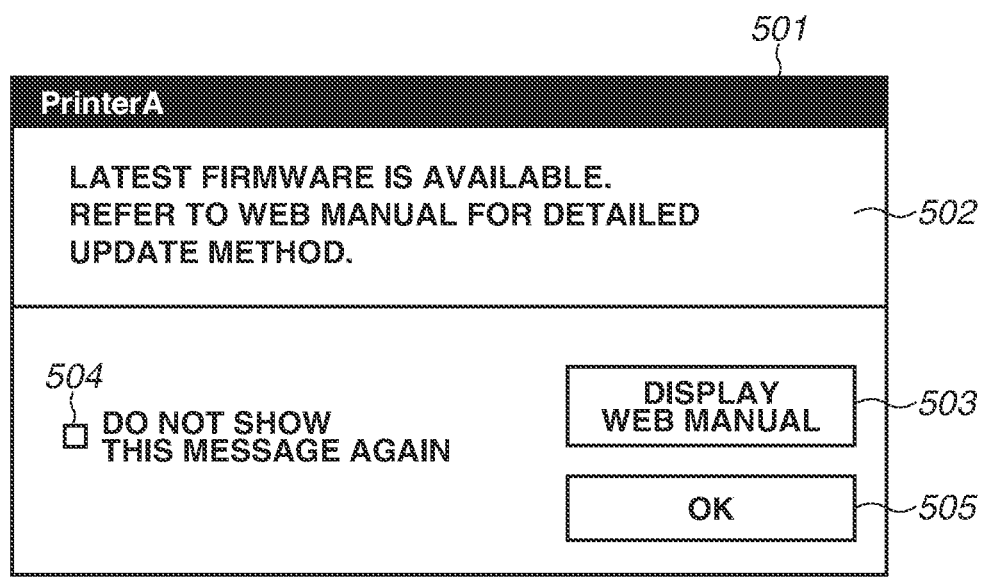
FIG. 5 illustrates an example of a screen for prompting a user to update firmware.

In step S403, the CPU 103 issues a notification about the update of the firmware of the communication apparatus 150. Specifically, the CPU 103 performs processing for prompting the user to update the firmware of the communication apparatus 150. More specifically, the CPU 103 displays a screen 501 as illustrated in FIG. 5, for example. The screen 501 includes a message display section 502, a web manual display button 503, a checkbox 504, and an OK button 505. The message display section 502 displays a message for prompting the user to update the firmware of the communication apparatus 150. The web manual display button 503 is a button for displaying a web page indicating an operation procedure for updating the firmware of the communication apparatus 150 on the browser application on the PC 100. If the checkbox 504 is checked by a user operation, this notification is controlled so as not to be issued again even if the information about the communication apparatus 150 is obtained and the firmware currently stored in the communication apparatus 150 is determined to be desirably updated. If the OK button 505 is operated, the CPU 103 ends displaying the screen 501 and ends the processing of this flowchart. In ending the processing of this flowchart, the CPU 103 may issue a notification of the progress of the processing of a received print job in the communication apparatus 150, an error occurred in the communication apparatus 150, and the remaining ink level and the remaining number of sheets in the communication apparatus 150 based on the information obtained in step S401.

This processing may be processing for prompting the user to enable the automatic update function.

With such a configuration, the message display section 502 may display a message for prompting the user to enable the automatic update function of the communication apparatus 150. The web manual display button 503 may be a button for displaying the web page indicating the operation procedure of the communication apparatus 150 for enabling the automatic update function of the communication apparatus 150 on the browser application.

In this processing, a button for transmitting a command to enable the automatic update function of the communication apparatus 150 may be displayed on the display unit 107. If the button is operated, the CPU 103 transmits the command to enable the automatic update function of the communication apparatus 150 to the communication apparatus 150. The CPU 103 may be configured to not display the button and configured to automatically transmit the command in step S403 without receiving a user operation on the button. The communication apparatus 150 enables the automatic update function of the communication apparatus 150 in a case where the communication apparatus 150 receives the command.

The details of the notification in step S403 are not limited to the foregoing. For example, the CPU 103 may perform processing of issuing a notification that the firmware of the communication apparatus 150 is not the latest version. As another example, the CPU 103 may perform processing of issuing a notification that the firmware of the communication apparatus 150 has not been updated.

Such a configuration enables the user to recognize a necessity of the update of the firmware in a case where the firmware of the communication apparatus 150 is to be updated. As described above, in the present exemplary embodiment, the user can enable the automatic update function of the communication apparatus 150 or immediately start to update the firmware of the communication apparatus 150 by operating the communication apparatus 150. The notified user can thus update the firmware of the communication apparatus 150 by making the foregoing operation for update.

A second exemplary embodiment of the present disclosure will be described below. The first exemplary embodiment has dealt with the configuration where the communication apparatus 150 is connected to the network 190 and can receive the update data from the management server 200 via the network 190. In the second exemplary embodiment, a configuration where a communication system can include a communication apparatus 150 that is not connected to a network 190 and unable to receive update data from a management server 200 via the network 190 will be described.

Apparatuses included in the communication system according to the present exemplary embodiment shall be configured similarly to those included in the communication system according to the first exemplary embodiment unless otherwise specified.

Figure 3B:
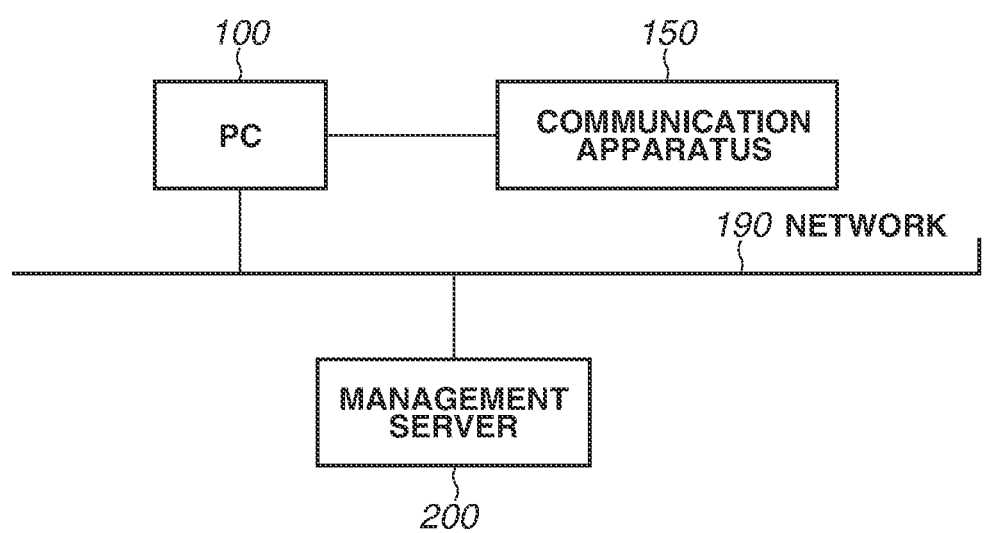

FIG. 3B is a block diagram illustrating the configuration of the communication system including the communication apparatus 150 that is not connected to the network and unable to receive update data from the management server 200 via the network 190. In this communication system, a PC 100 and the management server 200 are both connected to the network 190. By contrast, the communication apparatus 150 is not connected to the network 190. The communication apparatus 150 in the present communication system may be an apparatus having no function for connecting to the network 190. The communication apparatus 150 may be an apparatus that has a function for connecting to the network 190 but is not connected to the network 190 using the function. Examples of the apparatus having no function for connecting to the network 190 include an apparatus having no network interface for connecting to the network 190. More specifically, such an apparatus is one including only a USB network interface. The communication apparatus 150 is connected to the PC 100 without the intervention of the network 190. The communication method used to connect the communication apparatus 150 and the PC 100 is not limited in particular. A wired communication method for performing communication using a USB cable may be used. A wireless communication method, such as Wi-Fi and Bluetooth®, may be used. That is, in the present exemplary embodiment, the communication apparatus 150 and the PC 100 communicate with each other without the intervention of the network 190, and the management server 200 and the PC 100 communicate with each other via the network 190. The communication apparatus 150 and the management server 200 do not communicate with each other. The PC 100 and the management server 200 may be connected to the network 190 via a wireless LAN router, for example.

Figure 7:
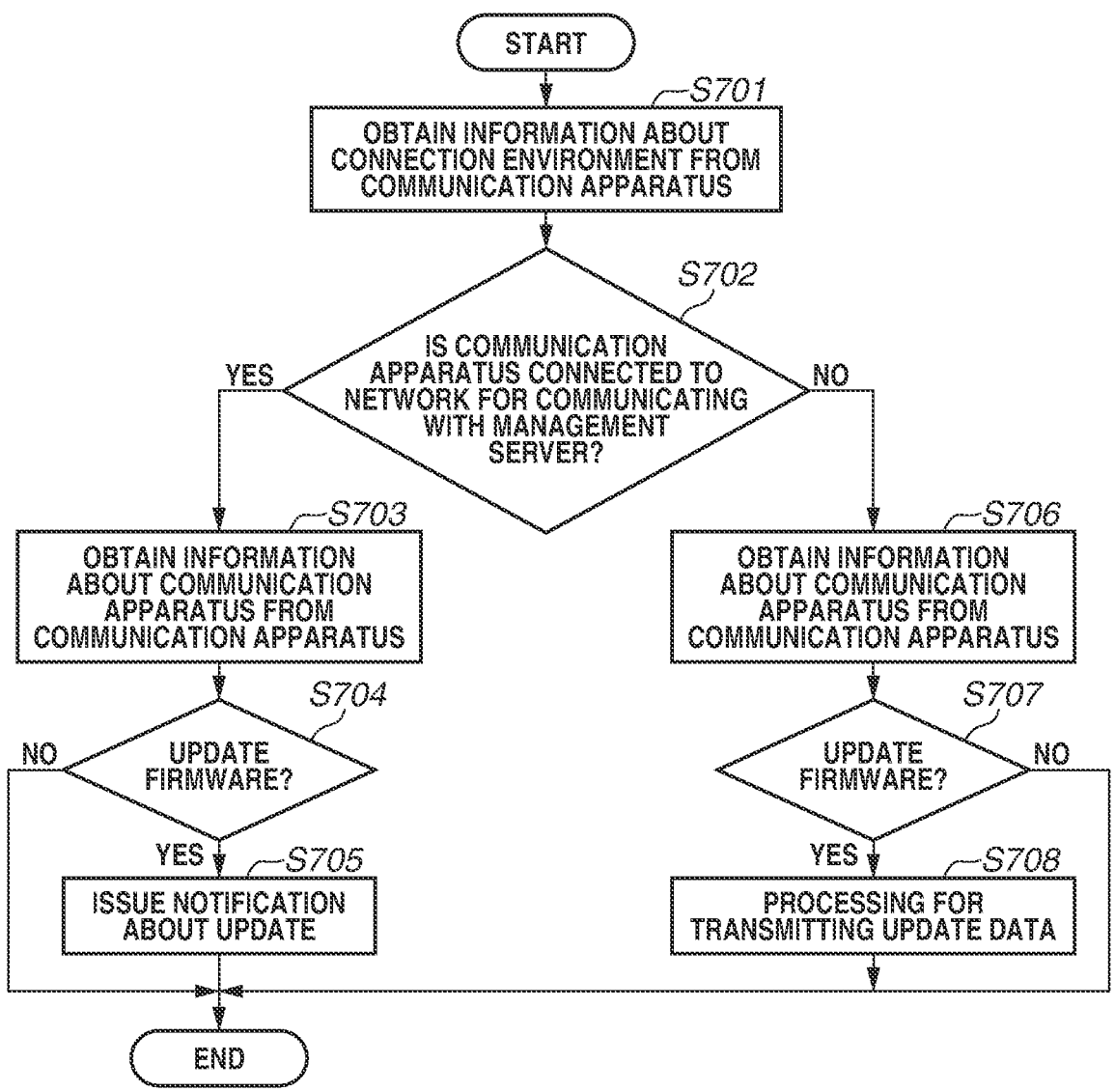
FIG. 7 is a flowchart illustrating notification processing which is performed by the information processing apparatus.

FIG. 7 is a flowchart illustrating processing performed by the PC 100 according to the present exemplary embodiment.

This processing is implemented by the CPU 103 reading various programs stored in storage areas, such as the ROM 104 and the RAM 105 and executing the programs. This processing is performed by the printer driver 112 based on activation of the printer driver 112.

In step S701, the CPU 103 obtains information about a connection environment of the communication apparatus 150 from the communication apparatus 150. The information about the connection environment of the communication apparatus 150 refers to, for example, information indicating whether the communication apparatus 150 is connected to the network 190. Examples include information indicating whether the communication apparatus 150 includes a network interface for connecting to the network 190.

In step S702, the CPU 103 determines whether the communication apparatus 150 is connected to the network 190 for communicating with the management server 200 based on the information received in step S701. In this determination, whether or not the communication apparatus 150 includes a network interface for connecting to the network 190 may be determined. Further, in this determination, whether or not the communication apparatus 150 can communicate with the management server 200 may be determined, for example. If the determination is YES (YES in step S702), the processing proceeds to step S703. If the determination is NO (NO in step S702), the processing proceeds to step S706.

The operations in steps S703 to S705 are similar to those in steps S401 to S403. A description thereof will thus be omitted.

In step S706, the CPU 103 obtains information about the communication apparatus 150 from the communication apparatus 150 via the connection between the communication apparatus 150 and the PC 100. As with the information obtained in step S401, the information about the communication apparatus 150 to be obtained here is the status information stored by the status management program, for example. The information about the communication apparatus 150 includes information about the firmware currently stored in the communication apparatus 150. However, the communication apparatus 150 here is not connected to the network 190. The communication apparatus 150 is therefore unable to receive information about the latest firmware from the management server 200, and unable to determine whether the version of the firmware currently stored in the communication apparatus 150 is the latest version of the firmware. The information received here is therefore not an error code but information indicating the version of the information about the firmware currently stored in the communication apparatus 150 or information indicating whether the automatic update function of the communication apparatus 150 is enabled. The communication apparatus 150 may thus switch the contents of information to be transmitted as the information about the firmware currently stored in the communication apparatus 150 based on whether the communication apparatus 150 is connected to the network 190. Specifically, if the communication apparatus 150 is connected to the network 190, the communication apparatus 150 may make the determination by itself and transmit the error code based on a determination result "NO". If the communication apparatus 150 is not connected to the network 190, the communication apparatus 150 may omit to make the determination by itself and may transmit the information indicating the version of the information about the firmware currently stored in the communication apparatus 150 or the information indicating whether the automatic update function of the communication apparatus 150 is enabled.

The operation in step S707 is similar to that in step S402. A description will thus be omitted. The information obtained in step S703 or S706 may be obtained in step S701. In such a case, the operations in step S703 and S706 are omitted. If the determination in step S702 is NO, the following transmission processing is not performed. And if the determination in step S707 is NO, the following transmission processing is not performed.

Figure 8:
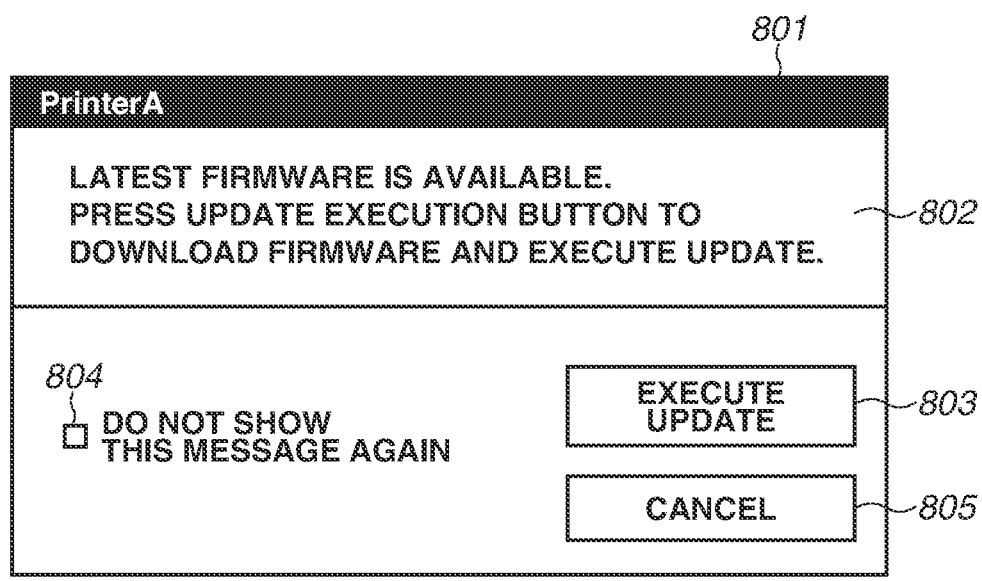
FIG. 8 illustrates an example of a screen for transmitting update data.

In step S708, the CPU 103 performs processing (transmission processing) for transmitting update data to the communication apparatus 150. Specifically, the CPU 103 displays a screen 801 for transmitting the update data to the communication apparatus 150, as illustrated in FIG. 8. The screen 801 includes a message display section 802, an update execution button 803, a checkbox 804, and a cancel button 805. The message display section 802 displays a message for prompting the user to update the firmware of the communication apparatus 150. In the present exemplary embodiment, a message for prompting the user to operate (press) the update execution button 803 is displayed since the update can be performed by operating the update execution button 803. The update execution button 803 is a button for executing the update of the firmware of the communication apparatus 150. Processing to be performed when the update execution button 803 is operated will be described below. If the checkbox 804 is checked by a user operation, this processing is controlled so as not to be performed again even if the information about the communication apparatus 150 is obtained and the firmware currently stored in the communication apparatus 150 is determined to be updated. If the cancel button 805 is operated, the CPU 103 ends displaying the screen 801, and the processing of this flowchart ends without transmitting the update data to the communication apparatus 150. If the update execution button 803 is operated and the processing of FIG. 9 to be described below ends, the processing of this flowchart ends. In step S708, the CPU 103 issues a notification different at least in part from that in step S705, or equivalently, the contents of the notification issued (for example, message displayed) may be partly the same.

FIG. 9 is a flowchart illustrating processing which is performed by the PC 100 in a case where the update execution button 803 is operated in the present exemplary embodiment. This processing is implemented by the CPU 103 reading various programs stored in storage areas such as the ROM 104 and the RAM 105 and executing the programs. The processing is performed by the printer driver 112 based on the operation of the update execution button 803.

In step S901, the CPU 103 transmits identification information about the communication apparatus 150 (such as information about the type of communication apparatus 150 and information about the model number of the communication apparatus 150) to the management server 200 via the network 190. The CPU 103 may obtain the identification information about the communication apparatus 150 in step S701, S706, or S901. If the identification information about the communication apparatus 150 is transmitted, the management server 200 identifies the update data corresponding to the identification information (update data corresponding to the communication apparatus 150) among a plurality of pieces of update data stored in the management server 200. The management server 200 transmits the identified update data to the PC 100 via the network 190.

In step S902, the CPU 103 receives the update data from the management server 200 via the network 190.

In step S903, the CPU 103 transmits the received update data to the communication apparatus 150 via the connection between the PC 100 and the communication apparatus 150. The communication apparatus 150 can thereby receive the update data despite the absence of connection with the network 190, and can update the firmware by using the update data.

Here, the CPU 103 may receive information about the state of the communication apparatus 150 from the communication apparatus 150. Subsequently, the CPU 103 may transmit the update data in a case where the communication apparatus 150 is found to be operating in an updatable state, and not transmit the update data in a case where the communication apparatus 150 is found to be operating in a non-updatable state. Examples of the updatable state include where the communication apparatus 150 is not operated by a user, where the communication apparatus 150 is not printing, where the communication apparatus 150 is free of errors, and where the communication apparatus 150 is not displaying a specific screen.

In step S904, the CPU 103 determines whether to display a screen (progress screen) indicating the progress of the update of the firmware in the communication apparatus 150. Specifically, the CPU 103 initially obtains information about the display capability of the communication apparatus 150. An example of the information about the display capability of the communication apparatus 150 is information indicating whether the communication apparatus 150 includes the display unit 155. Another example is information indicating whether the display unit 155 included in the communication apparatus 150 can display the screen indicating the progress of the update of the firmware in the communication apparatus 150. The reason is that low-end models of communication apparatuses 150 may lack the display unit 155 or include only a display unit 155 with low display capability. The information about the display capability of the communication apparatus 150 may be obtained in step S701 or S706. If the communication apparatus 150 does not include the display unit 155 or if the display unit 155 included in the communication apparatus 150 is unable to display the screen that indicates the progress of the update of the firmware in the communication apparatus 150, the CPU 103 determines to display the progress screen (YES in step S904). By contrast, if the communication apparatus 150 includes the display unit 155 or if the display unit 155 included in the communication apparatus 150 can display the screen that indicates the progress of the update of the firmware in the communication apparatus 150, the CPU 103 determines to not display the progress screen (NO in step S904). If the determination is YES (YES in step S904), the processing proceeds to step S905. If the determination is NO (NO in step S904), the processing of this flowchart ends.

Figure 10A:
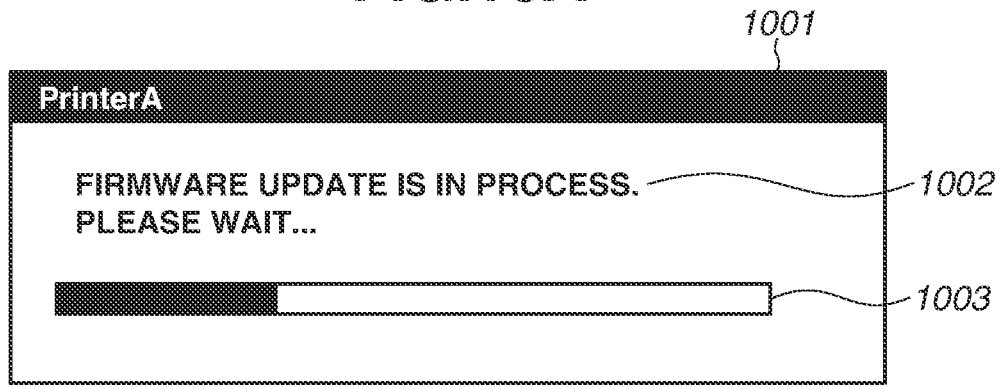
FIGS. 10A and 10B illustrate examples of a progress screen and a completion screen.
Figure 10B:
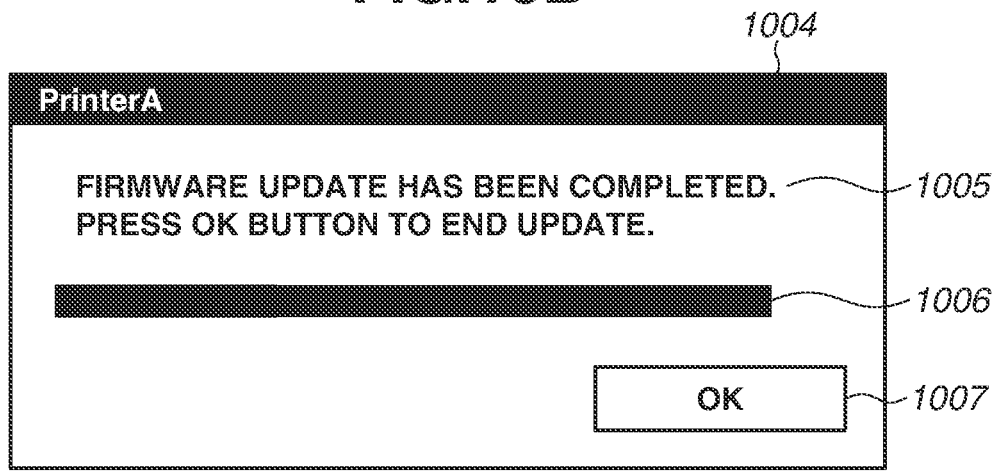

In step S905, to display the progress screen, the CPU 103 obtains information indicating the progress of the update being performed of the firmware of the communication apparatus 150 by the communication apparatus 150 from the communication apparatus 150 as appropriate. In step S906, the CPU 103 displays the screen (progress screen) indicating the progress of the update being performed of the firmware of the communication apparatus 150 by the communication apparatus 150 on the display unit 107. FIG. 10A illustrates an example of a progress screen 1001. A message display section 1002 displays a message indicating that the firmware of the communication apparatus 150 is being updated. A bar 1003 is a bar indicating the progress of the update of the firmware in the communication apparatus 150. If the update of the firmware of the communication apparatus 150 is completed, a completion screen 1004 illustrated in FIG. 10B is displayed on the display unit 107.

A message display section 1005 displays a message indicating that the update of the firmware of the communication apparatus 150 is completed. A bar 1006 indicates that the update of the firmware of the communication apparatus 150 is completed. If a button 1007 is operated, the processing of this flowchart ends. If the update of the firmware of the communication apparatus 150 is not completed but aborted due to reasons such as the occurrence of an error in the communication apparatus 150, a screen indicating the incompletion may be displayed.

With such a configuration, the firmware of the communication apparatus 150 not connected to the network 190 can be easily updated. Even in updating the firmware of a communication apparatus 150 with low display capability, the user can be notified of the progress of the update of the firmware in the communication apparatus 150.

In the present exemplary embodiment, displaying and hiding of the progress screen is switched based on the display capability of the communication apparatus 150. However, the progress screen may be displayed regardless of the display capability of the communication apparatus 150. Alternatively, the progress screen may be hidden regardless of the display capability of the communication apparatus 150.

In the present exemplary embodiment, the update data is transmitted based on the operation of the update execution button 803. However, such a configuration is not restrictive. The CPU 103 may automatically transmit the update data without displaying the screen 801 or receiving a user operation.

<Other Exemplary Embodiments>

In the foregoing description, the printer driver 112 is described to perform the processing of the flowcharts. However, such a configuration is not restrictive. The processing of the flowcharts may be performed by programs other than the printer driver 112.

Specifically, for example, the processing may be performed by an application program for controlling the communication apparatus 150.

In the foregoing description, the firmware of the communication apparatus 150 is described to be updated. However, the program to be updated is not limited to the firmware and may be any program in the communication apparatus 150. For example, an application program in the communication apparatus 150 may be updated.

In the foregoing description, the notification about the update is described to be issued if the version of the firmware currently stored in the communication apparatus 150 is not the latest version of the firmware. However, such a configuration is not restrictive. For example, the version of the firmware currently stored in the communication apparatus 150 can be the latest version of the firmware with the automatic update function of the communication apparatus 150 disabled. In such a case, the firmware of the communication apparatus 150 is unable to be promptly updated in a case where the latest firmware is updated in the future. If the automatic update function of the communication apparatus 150 is disabled, the notification about the update may therefore be issued regardless of whether the version of the firmware currently stored in the communication apparatus 150 is the latest version of the firmware. In such a case, the notification about the update is processing for prompting the user to activate the automatic update function.

An exemplary embodiment of the present disclosure is also implemented by performing the following processing. The processing includes supplying software (program) for implementing the functions of the foregoing exemplary embodiments to a system or an apparatus via a network or various storage media, and reading and executing the program by a computer (or CPU or micro processing unit (VIPU)) of the system or apparatus. The program may be executed by a single computer or executed by a plurality of computers in a cooperative manner. All the foregoing processing does not need to be implemented by software, and part or all of the processing may be implemented by hardware such as an application specific integrated circuit (ASIC). The CPU is not limited to a single CPU that performs all the processing, either, and a plurality of CPUs may perform the processing in a cooperative manner as appropriate.

Processing for more appropriately updating a program stored in a communication apparatus can be performed.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control method for an information processing apparatus, the control method comprising:
   obtaining information about a predetermined program stored in a communication apparatus; and
   performing a predetermined notification about update of the predetermined program based on the obtained information about the predetermined program,
   wherein the predetermined notification is performed in a case where a version of the predetermined program is not a latest version, and the predetermined notification is not performed in a case where the version of the predetermined program is the latest version, and
   wherein the predetermined notification is a notification for showing a user a predetermined operation procedure that is an operation procedure for updating the predetermined program and is an operation procedure about the communication apparatus.

2. The control method according to claim 1, wherein the predetermined notification further includes a notification that the version of the predetermined program is not the latest version.

3. The control method according to claim 1, wherein the information about the predetermined program includes information indicating that the version of the predetermined program is not the latest version.

4. The control method according to claim 1, wherein the information about the predetermined program includes information indicating the version of the predetermined program.

5. The control method according to claim 1, wherein the predetermined notification is controlled to be issued in a case where the version of the predetermined program is not the latest version and the communication apparatus is connected to a network for communicating with a predetermined server storing update data for updating the predetermined program, and a notification different from the predetermined notification is controlled to be issued in a case where the version of the predetermined program is not the latest version and the communication apparatus is not connected to the network.

6. The control method according to claim 1, wherein, in a case where the version of the predetermined program is not the latest version and the communication apparatus is connected to a network for communicating with a predetermined server storing update data for updating the predetermined program, processing of transmitting the update data to the communication apparatus is not executed, and in a case where the version of the predetermined program is not the latest version and the communication apparatus is not connected to the network, the processing of transmitting the update data to the communication apparatus is executed.

7. The control method according to claim 6, wherein the predetermined notification is performed in a case where the version of the predetermined program is not the latest version and the communication apparatus is connected to a network for communicating with a predetermined server storing update data for updating the predetermined program, and the predetermined notification is not performed in a case where the version of the predetermined program is not the latest version and the communication apparatus is not connected to the network.

8. The control method according to claim 6, further comprising:
   receiving the update data from the predetermined server,
   wherein the update data received from the predetermined server is transmitted to the communication apparatus.

9. The control method according to claim 6, further comprising:
   displaying, in a case where the processing of transmitting the update data to the communication apparatus is executed, a progress screen indicating progress of update of the predetermined program based on the update data on a display unit of the information processing apparatus.

10. The control method according to claim 9, wherein the progress screen is controlled to be displayed on the display unit of the information processing apparatus in a case where the processing of transmitting the update data to the communication apparatus is performed and the communication apparatus does not include a display unit, and the progress screen is controlled so as not to be displayed on the display unit of the information processing apparatus in a case where the processing of transmitting the update data to the communication apparatus is performed and the communication apparatus includes the display unit.

11. The control method according to claim 1, wherein the predetermined notification includes processing of displaying a button for displaying a web page for showing the user the predetermined operation procedure.

12. The control method according to claim 1, wherein the predetermined operation procedure is an operation procedure for enabling an automatic update function that is a function of trying updating the predetermined program automatically without any user operation on the communication apparatus in a case where a predetermined condition is satisfied.

13. The control method according to claim 1, wherein the predetermined program is firmware.

14. The control method according to claim 1, wherein the communication apparatus includes a printer.

15. An information processing apparatus, comprising:
   an obtaining unit configured to obtain information about a predetermined program stored in a communication apparatus; and
   a notification unit configured to perform a predetermined notification about update of the predetermined program based on the obtained information about the predetermined program,
   wherein the predetermined notification is performed in a case where a version of the predetermined program is not a latest version, and the predetermined notification is not performed in a case where the version of the predetermined program is the latest version, and
   wherein the predetermined notification is a notification for showing a user a predetermined operation procedure that is an operation procedure for updating the predetermined program and is an operation procedure about the communication apparatus.

16. A non-transitory computer-readable medium storing one or more programs including instructions, which when executed by one or more processors of an information processing apparatus, cause the information processing apparatus to perform a method comprising:
   obtaining information about a predetermined program stored in a communication apparatus; and
   performing a predetermined notification about update of the predetermined program based on the obtained information about the predetermined program,
   wherein the predetermined notification is performed in a case where a version of the predetermined program is not a latest version, and the predetermined notification is not performed in a case where the version of the predetermined program is the latest version, and
   wherein the predetermined notification is a notification for showing a user a predetermined operation procedure that is an operation procedure for updating the predetermined program and is an operation procedure about the communication apparatus.

* * * * *